(12) United States Patent
Tsutsumi et al.

(10) Patent No.: US 10,294,879 B2
(45) Date of Patent: May 21, 2019

(54) CONTROL APPARATUS FOR INTERNAL COMBUSTION ENGINE WITH SUPERCHARGER AND METHOD FOR CONTROLLING INTERNAL COMBUSTION ENGINE WITH SUPERCHARGER

(71) Applicant: HONDA MOTOR CO., LTD., Tokyo (JP)

(72) Inventors: Yujiro Tsutsumi, Wako (JP); Kentaro Miki, Wako (JP); Yosuke Shima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/869,044

(22) Filed: Jan. 12, 2018

(65) Prior Publication Data
US 2018/0216549 A1    Aug. 2, 2018

(30) Foreign Application Priority Data

Jan. 27, 2017    (JP) .................................. 2017-012769

(51) Int. Cl.
*F02B 37/12*    (2006.01)
*F02D 41/00*    (2006.01)
*F02D 23/00*    (2006.01)
*F02B 37/18*    (2006.01)
*F02D 41/14*    (2006.01)

(52) U.S. Cl.
CPC .......... *F02D 41/0007* (2013.01); *F02B 37/18* (2013.01); *F02D 23/00* (2013.01); *F02D 23/005* (2013.01); *F02D 41/1402* (2013.01); *F02D 2200/0406* (2013.01); *Y02T 10/144* (2013.01)

(58) Field of Classification Search
CPC ...... F02D 41/0007; F02D 41/14; F02D 23/00; F02D 23/005; F02D 2200/0406; F02B 37/18
USPC .............................. 123/559.1, 562, 564, 565
See application file for complete search history.

(56) References Cited

FOREIGN PATENT DOCUMENTS

JP    04-241736    8/1992

*Primary Examiner* — Hai H Huynh
(74) *Attorney, Agent, or Firm* — Mori & Ward, LLP

(57) ABSTRACT

A control apparatus for an internal combustion engine with a supercharger includes a boost-pressure detector. When first boost pressure control to control the supercharger such that a boost pressure reaches a target pressure starts, starts, the target pressure is set to an initial target pressure, gradually at a first rate, and then gradually increased to a steady-state target boost pressure at a second rate smaller than the first rate if the boost pressure is equal to or higher than a threshold pressure. Second boost pressure control is performed such that the boost pressure reaches a steady-state target boost pressure. Inhibiting/allowing circuitry is configured to inhibit execution of the first boost pressure control and allow execution of the second boost pressure control if the boost pressure is lower than the steady-state target boost pressure and if the steady-state target boost pressure is lower than the threshold pressure.

8 Claims, 7 Drawing Sheets

CONTROL APPARATUS FOR INTERNAL COMBUSTION ENGINE WITH SUPERCHARGER AND METHOD FOR CONTROLLING INTERNAL COMBUSTION ENGINE WITH SUPERCHARGER

CROSS-REFERENCE TO RELATED APPLICATIONS

The present application claims priority under 35 U.S.C. § 119 to Japanese Patent Application No. 2017-012769, filed Jan. 27, 2017, entitled "Control Apparatus for Internal Combustion Engine." The contents of this application are incorporated herein by reference in its entirety.

BACKGROUND

1. Field

The present disclosure relates to a control apparatus for an internal combustion engine with a supercharger and a method for controlling an internal combustion engine with a supercharger.

2. Description of the Related Art

In the related art, a control apparatus described in Japanese Unexamined Patent Application Publication No. 4-241736 is known as a control apparatus for an internal combustion engine. The internal combustion engine used for a vehicle power source includes a turbocharger, a waste gate valve for changing the boost pressure of the turbocharger, a diaphragm actuator that opens/closes the waste gate valve, and an electromagnetic on-off valve that changes the pressure supplied to the actuator.

The control apparatus controls the duty ratio of a control input signal supplied to the electromagnetic on-off valve, so as to control the boost pressure of the turbocharger. The control apparatus includes a pressure sensor that detects the actual boost pressure and a rotational speed sensor that detects the engine rotational speed. The control apparatus sets the target boost pressure by searching a map in accordance with the engine rotational speed, and determines whether or not the pressure difference between the target boost pressure and the actual boost pressure is equal to or less than a determination value. When the pressure difference is more than the determination value, the control apparatus sets the duty ratio of the control input signal to the maximum value.

In contrast, when the pressure difference is equal to or less than the determination value, the determination value is corrected. Specifically, after the duty ratio of the control input signal is set so as to be changed from the maximum value to a given value less than the maximum value, control is exerted so that the duty ratio is decreased gradually from the given value. Then, after the duty ratio is thus decreased gradually, the amount of overshoot of the actual boost pressure with respect to the target boost pressure is calculated. A learned correction value is calculated in accordance with the amount of overshoot. In this case, when the amount of overshoot exceeds an appropriate level, as the amount of overshoot increases, the learned correction value is set to a higher value. When the amount of overshoot is equal to or less than the appropriate level, the learned correction value is set to zero. By adding the learned correction value to the current determination value, the determination value is corrected. After that, by using the corrected determination value, the boost pressure is controlled. Thus, after the correction of the determination value, occurrence of overshoot of the boost pressure is suppressed.

SUMMARY

According to one aspect of the disclosure, there is provided a control apparatus for an internal combustion engine. The control apparatus controls boost pressure through control of a supercharger. The control apparatus includes a boost-pressure acquiring unit, a target steady-state boost pressure calculating unit, a first boost pressure controller, a target-boost-pressure setting unit, a second boost pressure controller, and an inhibiting/allowing unit. The boost-pressure acquiring unit acquires the boost pressure. The target steady-state boost pressure calculating unit calculates target steady-state boost pressure which is a target of the boost pressure when the internal combustion engine operates in a steady state. The calculation is performed in accordance with an operation state of the internal combustion engine. When the boost pressure is lower than the target steady-state boost pressure, the first boost pressure controller performs first boost pressure control by using a given feedback control algorithm in such a manner that the boost pressure reaches target boost pressure. In the first boost pressure control, the supercharger is controlled. The target-boost-pressure setting unit performs a first setting operation, a second setting operation, and a third setting operation. The first setting operation is an operation in which, when the first boost pressure control starts, the target-boost-pressure setting unit sets the target boost pressure to a given pressure. The given pressure is lower than the target steady-state boost pressure. The second setting operation is an operation in which, in the case where the target boost pressure is set to the given pressure, when a deviation between the boost pressure obtained in execution of the first boost pressure control and the given pressure is equal to or less than a given value, the target-boost-pressure setting unit sets the target boost pressure in such a manner that the target boost pressure is increased gradually with a first given rate from the given pressure. The third operation is an operation in which, in the case where the target boost pressure is increased gradually with the first given rate, when the target boost pressure is equal to or higher than a given threshold pressure, the target-boost-pressure setting unit sets the target boost pressure in such a manner that the target boost pressure is increased gradually with a second given rate to the target steady-state boost pressure. The second given rate is smaller than the first given rate. When the boost pressure is lower than the target steady-state boost pressure, the second boost pressure controller performs second boost pressure control by using the given feedback control algorithm in such a manner that the boost pressure reaches the target steady-state boost pressure. In the second boost pressure control, the supercharger is controlled. In the case where the boost pressure is lower than the target steady-state boost pressure, when the target steady-state boost pressure is lower than the given threshold pressure, the inhibiting/allowing unit inhibits execution of the first boost pressure control and allows execution of the second boost pressure control.

According to another aspect of the disclosure, a control apparatus for an internal combustion engine with a supercharger includes a boost-pressure detector, calculating circuitry, first boost pressure control circuitry, target pressure setting circuitry, second boost pressure control circuitry, and inhibiting/allowing circuitry. The boost-pressure detector is to detect a boost pressure controlled by the supercharger.

The calculating circuitry is configured to calculate, in accordance with an operation state of the internal combustion engine, a steady-state target boost pressure in a steady operation state of the internal combustion engine. The first boost pressure control circuitry is configured to perform first boost pressure control with a feedback control algorithm to control the supercharger such that the boost pressure reaches a target pressure if the boost pressure is lower than the steady-state target boost pressure. The target pressure setting circuitry is configured to set the target pressure to an initial target pressure lower than the steady-state target boost pressure when the first boost pressure control starts, gradually increase the target pressure from the initial target pressure at a first rate if the target pressure is set to the initial target pressure and if a difference pressure between the boost pressure detected during execution of the first boost pressure control and the initial target pressure is equal to or less than a difference threshold pressure, and gradually increase the target pressure to the steady-state target boost pressure from the initial target pressure at a second rate smaller than the first rate if the boost pressure detected during execution of the first boost pressure control is equal to or higher than a threshold pressure while the target pressure is increased gradually at the first rate. The second boost pressure control circuitry is configured to perform second boost pressure control with the feedback control algorithm to control the supercharger such that the boost pressure reaches the steady-state target boost pressure if the boost pressure is lower than the steady-state target boost pressure. The inhibiting/allowing circuitry configured to inhibit execution of the first boost pressure control and allow execution of the second boost pressure control if the boost pressure is lower than the steady-state target boost pressure and if the steady-state target boost pressure is lower than the threshold pressure.

According to a further aspect of the disclosure, a control apparatus for an internal combustion engine with a supercharger includes boost-pressure detecting means, calculating means, first boost pressure control means, initial target pressure setting means, first gradually increasing means, second gradually increasing means, second boost pressure control means, and inhibiting/allowing means. The boost-pressure detecting means are for detecting a boost pressure controlled by the supercharger. The calculating means are for calculating, in accordance with an operation state of the internal combustion engine, a steady-state target boost pressure in a steady operation state of the internal combustion engine. The first boost pressure control means are for performing first boost pressure control with a feedback control algorithm to control the supercharger such that the boost pressure reaches a target pressure if the boost pressure is lower than the steady-state target boost pressure. The initial target pressure setting means are for setting the target pressure to an initial target pressure lower than the steady-state target boost pressure when the first boost pressure control starts. The first gradually increasing means are for gradually increasing the target pressure from the initial target pressure at a first rate if the target pressure is set to the initial target pressure and if a difference pressure between the boost pressure detected during execution of the first boost pressure control and the initial target pressure is equal to or less than a difference threshold pressure. The second gradually increasing means are for gradually increasing the target pressure to the steady-state target boost pressure from the initial target pressure at a second rate smaller than the first rate if the boost pressure detected during execution of the first boost pressure control is equal to or higher than a threshold pressure while the target pressure is increased gradually at the first rate. The second boost pressure control means are for performing second boost pressure control with the feedback control algorithm to control the supercharger such that the boost pressure reaches the steady-state target boost pressure if the boost pressure is lower than the steady-state target boost pressure. The inhibiting/allowing means are for inhibiting execution of the first boost pressure control and allowing execution of the second boost pressure control if the boost pressure is lower than the steady-state target boost pressure and if the steady-state target boost pressure is lower than the threshold pressure.

According to a further aspect of the disclosure, a method for controlling an internal combustion engine with a supercharger is disclosed. The method includes detecting a boost pressure controlled by the supercharger. The method includes calculating, in accordance with an operation state of the internal combustion engine, a steady-state target boost pressure in a steady operation state of the internal combustion engine. The method includes performing first boost pressure control with a feedback control algorithm to control the supercharger such that the boost pressure reaches a target pressure if the boost pressure is lower than the steady-state target boost pressure. The method includes setting the target pressure to an initial target pressure lower than the steady-state target boost pressure when the first boost pressure control starts. The method includes gradually increasing the target pressure from the initial target pressure at a first rate if the target pressure is set to the initial target pressure and if a difference pressure between the boost pressure detected during execution of the first boost pressure control and the initial target pressure is equal to or less than a difference threshold pressure. The method includes gradually increasing the target pressure to the steady-state target boost pressure from the initial target pressure at a second rate smaller than the first rate if the boost pressure detected during execution of the first boost pressure control is equal to or higher than a threshold pressure while the target pressure is increased gradually at the first rate. The method includes performing second boost pressure control with the feedback control algorithm to control the supercharger such that the boost pressure reaches the steady-state target boost pressure if the boost pressure is lower than the steady-state target boost pressure. The method includes inhibiting execution of the first boost pressure control and allowing execution of the second boost pressure control if the boost pressure is lower than the steady-state target boost pressure and if the steady-state target boost pressure is lower than the threshold pressure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
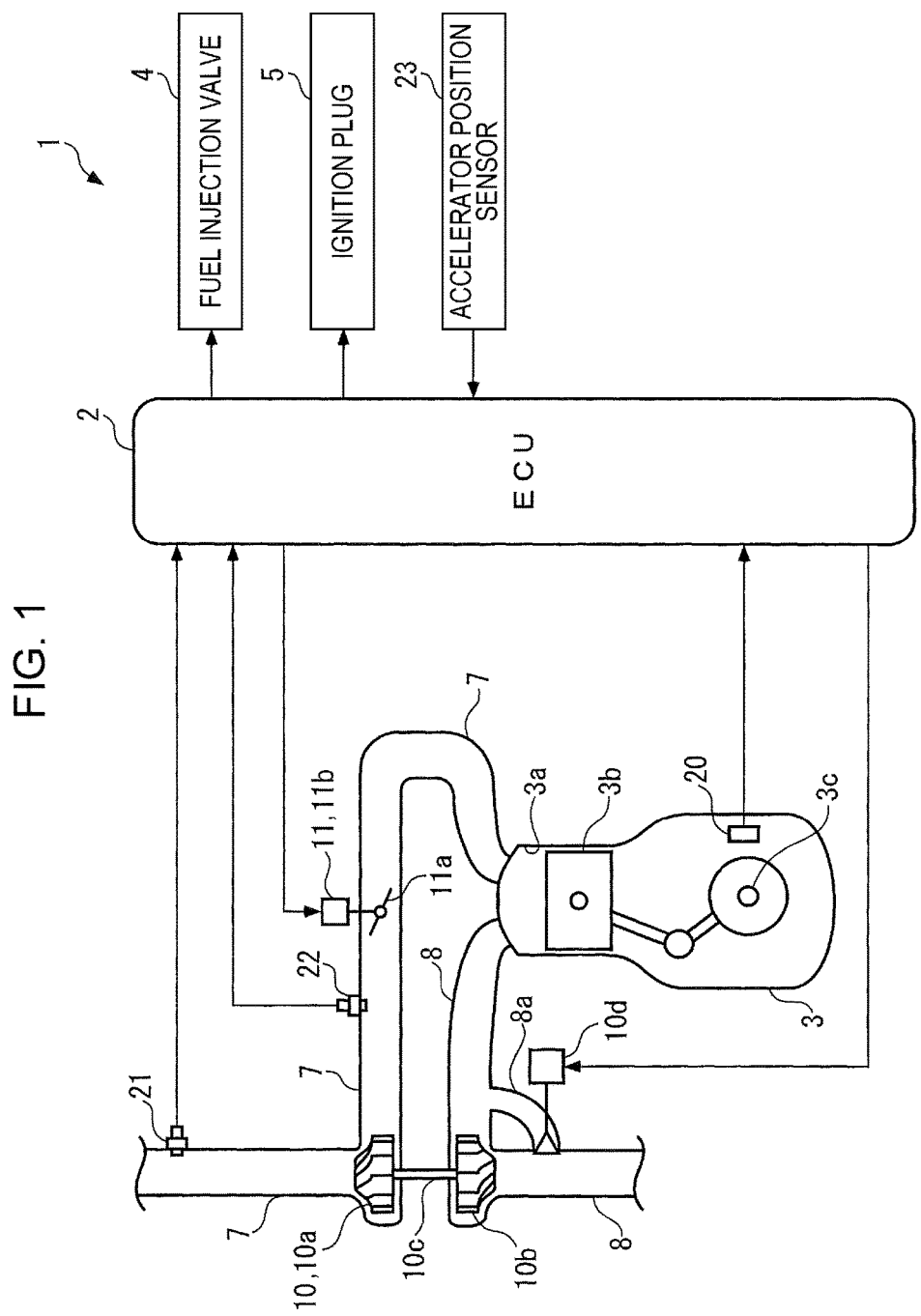
FIG. 1 is a schematic diagram illustrating the configuration of a control apparatus and an internal combustion engine to which the control apparatus is applied, according to an embodiment of the present disclosure.

The embodiments will now be described with reference to the accompanying drawings, wherein like reference numerals designate corresponding or identical elements throughout the various drawings.

A control apparatus for an internal combustion engine according to an embodiment of the present disclosure will be described below with reference to the drawings. As illustrated in FIG. 1, a control apparatus 1 applied to a turbocharger 10 of an internal combustion engine (hereinafter referred to as an "engine") 3 includes an electric control unit (ECU) 2. As described below, the ECU 2 performs a boost pressure control process and the like. Specifically, the ECU 2 is an example of calculating circuitry, first boost pressure control circuitry, target pressure setting circuitry, second boost pressure control circuitry, and inhibiting/allowing circuitry in this embodiment.

The internal combustion engine 3 is an in-line four-cylinder engine having four pairs of a cylinder 3a and a piston 3b. However, only one pair is illustrated. The internal combustion engine 3 is mounted in a vehicle (not illustrated) as a power source. In the engine 3, a fuel injection valve 4 and an ignition plug 5 are provided for each cylinder 3a. However, only one fuel injection valve 4 and one ignition plug 5 are illustrated. Each fuel injection valve 4 is electrically connected to the ECU 2 which controls the valve opening period and the valve opening timing of the fuel injection valve 4, that is, the amount of fuel consumption and the injection timing. In addition, each ignition plug 5 is also electrically connected to the ECU 2 which controls the ignition timing of the ignition plug 5.

The engine 3 is provided with a crank angle sensor 20. The crank angle sensor 20 outputs a CRK signal, which is a pulse signal, to the ECU 2 in accordance with rotation of a crankshaft 3c. In the CRK signal, one pulse is output for each given crank angle (for example, 30°). The ECU 2 calculates the rotational speed NE of the engine 3 (hereinafter referred to as the "engine rotational speed NE") on the basis of the CRK signal.

An air intake passage 7 of the engine 3 is provided with an air flow sensor 21, the turbocharger 10, a boost pressure sensor (a boost-pressure detector) 22, and a throttle valve mechanism 11 in this order from the upstream side. The air flow sensor 21 formed by using a hot-wire air flow meter detects the amount of air flow in the air intake passage 7, and outputs, to the ECU 2, a detection signal indicating the amount of air flow.

The turbocharger 10 (supercharger) includes a compressor 10a, a turbine 10b, a shaft 10c, and an electric waste gate valve 10d. The compressor 10a is provided along the air intake passage 7. The turbine 10b is provided along a gas exhaust passage 8. The shaft 10c couples the compressor 10a to the turbine 10b as an integral unit.

In the turbocharger 10, when the turbine 10b is rotated by exhaust gas in the gas exhaust passage 8, the compressor 10a rotates with the turbine 10b coupled as an integral unit. Thus, inhaled air in the air intake passage 7 is pressurized. That is, a supercharging operation is performed.

The electric waste gate valve 10d is provided for a bypass passage 8a for bypassing the compressor 10a. The electric waste gate valve 10d is formed by combining a valve body for opening/closing the bypass passage 8a and an electric actuator for opening/closing the valve body. The electric waste gate valve 10d is electrically connected to the ECU 2. The ECU 2 controls opening of the electric waste gate valve 10d so as to change the amount of flow of exhaust gas flowing through the bypass passage 8a by bypassing the turbine 10b, in other words, to change the amount of flow of exhaust gas for driving the turbine 10b. Thus, the boost pressure is controlled.

The boost pressure sensor 22 (boost-pressure acquiring unit) formed by using a semiconductor pressure sensor or the like outputs, to the ECU 2, a detection signal indicating a boost pressure PB. The boost pressure PB corresponds to an absolute pressure of air in the air intake passage 7 which is pressurized by the turbocharger 10.

The above-described throttle valve mechanism 11 includes a throttle valve 11a and a TH actuator 11b that opens/closes the throttle valve 11a. The throttle valve 11a is provided along the air intake passage 7 so as to be rotatable. Thus, a change in the opening in accordance with the rotation causes the amount of air flow passing through the throttle valve 11a to be changed.

The TH actuator 11b is formed by combining a motor (not illustrated) connected to the ECU 2 and a gear mechanism (not illustrated). The TH actuator 11b is controlled in accordance with a control input signal from the ECU 2 so that the opening of the throttle valve 11a is changed.

An accelerator position sensor 23 is connected to the ECU 2. The accelerator position sensor 23 detects the amount AP of stepping on an accelerator pedal (not illustrated) of the vehicle (hereinafter referred to as an "accelerator position AP"), and outputs, to the ECU 2, a detection signal indicating the accelerator position AP.

The ECU 2 is formed by using a microcomputer including a central processing unit (CPU), a random-access memory (RAM), a read-only memory (ROM), and an input/output (I/O) interface (which are not illustrated). In accordance with the detection signals from the above-described various sensors 20 to 23, the ECU 2 performs the boost pressure control process and the like as described below. In the present embodiment, the ECU 2 corresponds to a target steady-state boost pressure calculating unit, a first boost pressure controller, a target-boost-pressure setting unit, a second boost pressure controller, and an inhibiting/allowing unit.

The boost pressure control process performed by the ECU 2 will be described below with reference to FIGS. 2 to 5. In the boost pressure control process, the opening of the electric waste gate valve 10d is controlled so that the boost pressure PB reaches a target boost pressure PBcmd. The boost pressure control process is performed by the ECU 2 at every control cycle DT (for example, 10 msec). In the description below, various calculated/set values are stored in the RAM of the ECU 2.

Figure 2:
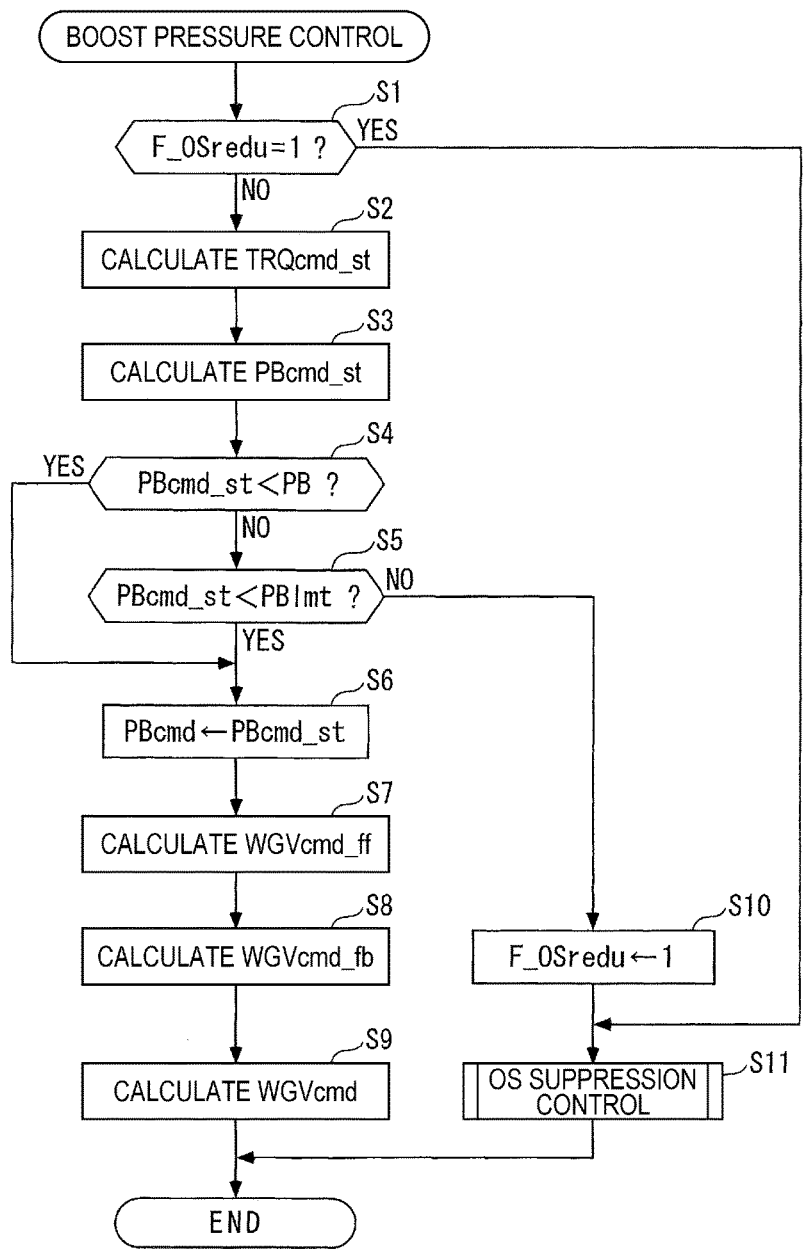
FIG. 2 is a flowchart of a boost pressure control process.

As illustrated in FIG. 2, in step 1 (in the figures, abbreviated as "S1", and the same is true for other steps), it is determined whether or not an overshoot suppression condition flag F_OSredu is set to "1". The overshoot suppression condition flag F_OSredu indicates whether or not the condition, which is described below, for performing an overshoot (OS) suppression control process is satisfied.

If the determination result in step 1 is NO, the process proceeds to step 2 in which a map (not illustrated) is searched in accordance with the engine rotational speed NE and the accelerator position AP. Thus, a target steady-state torque TRQcmd_st is calculated. The target steady-state torque TRQcmd_st corresponds to a target value of torque produced when the engine 3 operates in the steady state. In the present embodiment, the engine rotational speed NE and the accelerator position AP correspond to the operation state of an internal combustion engine.

The process proceeds to step 3 in which a map (not illustrated) is searched in accordance with the target steady-state torque TRQcmd_st. Thus, the target steady-state boost pressure PBcmd_st is calculated. The target steady-state boost pressure PBcmd_st corresponds to a target value of boost pressure necessary to produce the target steady-state torque TRQcmd_st when the engine 3 operates in the steady state. In the calculation map for the target steady-state boost pressure PBcmd_st, the target steady-state boost pressure PBcmd_st is set so that the maximum map value of the target steady-state boost pressure PBcmd_st is slightly smaller than the upper-limit boost pressure PBmax which is a boost pressure PB produced when the engine 3 produces the upper limit value of the capacity of torque transmittable in the driving system of a vehicle.

In step 4, it is determined whether or not the target steady-state boost pressure PBcmd_st is lower than the boost pressure PB. If the determination result is YES, that is, PBcmd_st<PB, the process proceeds to step 6 in which the target boost pressure PBcmd is set to the target steady-state boost pressure PBcmd_st.

The process proceeds to step 7 in which a map (not illustrated) is searched in accordance with the target boost pressure PBcmd. Thus, the feedforward (FF) term WGVcmd_ff of the target waste gate valve opening is calculated.

In step 8, a proportional-integral-derivative (PID) control algorithm is used to calculate a feedback (FB) term WGVcmd_fb of the target waste gate valve opening on the basis of the deviation between the target boost pressure PBcmd and the boost pressure PB (PBcmd-PB).

In step 9 which is the next step of step 8, Expression (1) described below is used to calculate the target waste gate valve opening WGVcmd. Then, the process ends.

WGVcmd=WGVcmd_ff+WGVcmd_fb            Expression (1)

As described above, when the target waste gate valve opening WGVcmd is calculated in step 9, a control input signal corresponding to the target waste gate valve opening WGVcmd is supplied to the electric waste gate valve 10*d*. Thus, control is exerted so that the boost pressure PB reaches the target boost pressure PBcmd. In this point, the same is true for control processes described below.

In contrast, if the determination result in step 4 is NO, that is, PBcmd_st≥PB, the process proceeds to step 5 in which it is determined whether or not the target steady-state boost pressure PBcmd_st is lower than a given threshold pressure PBlmt. The given threshold pressure PBlmt is set to a certain value obtained by subtracting a given value Pref from the upper-limit boost pressure PBmax (=PBmax−Pref) because of a reason described below.

If the determination result in step 5 is YES, that is, PBcmd_st<PBlmt, steps 6 to 9 are performed as described above. Then, the process ends. In the present embodiment, the control process in steps 6 to 9 performed when the determination result in step 5 is YES corresponds to second boost pressure control.

In contrast, if the determination result in step 5 is NO, that is, PBcmd_st≥PBlmt, it is determined that the condition for performing the OS suppression control process is satisfied. To indicate this, the process proceeds to step 10, and the overshoot suppression condition flag F_OSredu is set to "1". Then, the process proceeds to step 11.

Thus, in the case where the overshoot suppression condition flag F_OSredu is set to "1" in step 10, the above-described determination result in step 1 is YES at the next and subsequent control timings. Also in these cases, the process proceeds to step 11.

In step 11 which is the next step of step 1 or 10, as described below, after the OS suppression control process is performed, the process ends. In the present embodiment, the OS suppression control process in step 11 which is performed when the determination result in step 5 is NO corresponds to first boost pressure control.

The above-described OS suppression control process will be described with reference to FIG. 3. In the control process, control is exerted so that, while overshoot of the boost pressure PB with respect to the target steady-state boost pressure PBcmd_st is suppressed, the boost pressure PB reaches the target steady-state boost pressure PBcmd_st.

Figure 3:
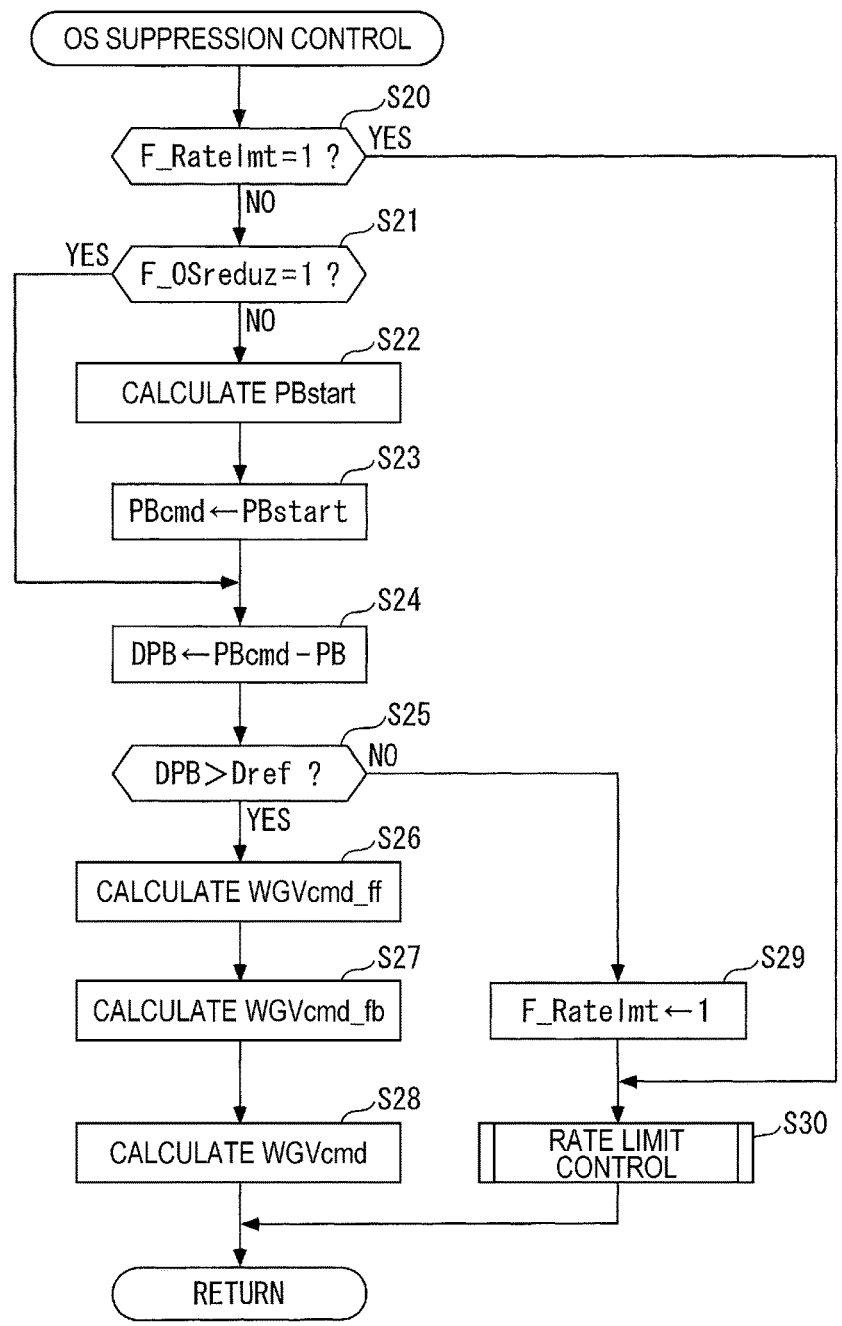
FIG. 3 is a flowchart of an overshoot (OS) suppression control process.

As illustrated in FIG. 3, in step 20, it is determined whether or not a rate limit condition flag F_Ratelmt is set to "1". The rate limit condition flag F_Ratelmt indicates whether or not the condition for performing a rate limit control process described below is satisfied.

If the determination result in step 20 is NO, that is, the condition for performing the rate limit control process is not satisfied, the process proceeds to step 21 in which it is determined whether or not the previous value F_OSreduz of the overshoot suppression condition flag is set to "1".

If the determination result is NO, that is, the current control timing is the first execution timing of the OS suppression control process, the process proceeds to step 22 in which a map (not illustrated) is searched in accordance with the engine rotational speed NE. Thus, a control start pressure PBstart (given pressure) is calculated. The control start pressure PBstart is calculated so that PBstart<PBlmt is satisfied.

The process proceeds to step 23 in which the target boost pressure PBcmd is set to the control start pressure PBstart. Then, the process proceeds to step 24.

In contrast, if the above-described determination result in step 21 is YES, that is, the OS suppression control process has been already performed at a control timing before the current control timing, the process proceeds to step 24.

In step 24 which is the next step of step 21 or 23, a boost-pressure deviation DPB is set to the deviation between the target boost pressure PBcmd and the boost pressure PB (PBcmd−PB).

The process proceeds to step 25 in which it is determined whether or not the boost-pressure deviation DPB is larger than a given value Dref. If the determination result is YES, a similar method to the method in steps 7 to 9 described above is used to perform steps 26 to 28, and the target waste gate valve opening WGVcmd is calculated in step 28. Then, the process ends.

In contrast, if the determination result in step 25 is NO, that is, DPB≤Dref, it is determined that the condition for performing the rate limit control process is satisfied. To indicate this, the process proceeds to step 29 in which the rate limit condition flag F_Ratelmt is set to "1". Then, the process proceeds to step 30. Thus, in the case where the rate limit condition flag F_Ratelmt is set to "1" in step 29, the above-described determination result in step 20 is YES at the next and subsequent control timings. Also in these cases, the process proceeds to step 30.

In step 30 which is the next step of step 20 or 29, the rate limit control process is performed. Then, the process ends as described below.

The above-described rate limit control process will be described with reference to FIG. 4. In the control process, the target boost pressure PBcmd is set so as to increase gradually to the target steady-state boost pressure PBcmd_st by using two increase ratio stages. Thus, control is exerted so that, while occurrence of overshoot of the boost pressure PB with respect to the target steady-state boost pressure PBcmd_st is suppressed, the boost pressure PB reaches the target steady-state boost pressure PBcmd_st.

Figure 4:
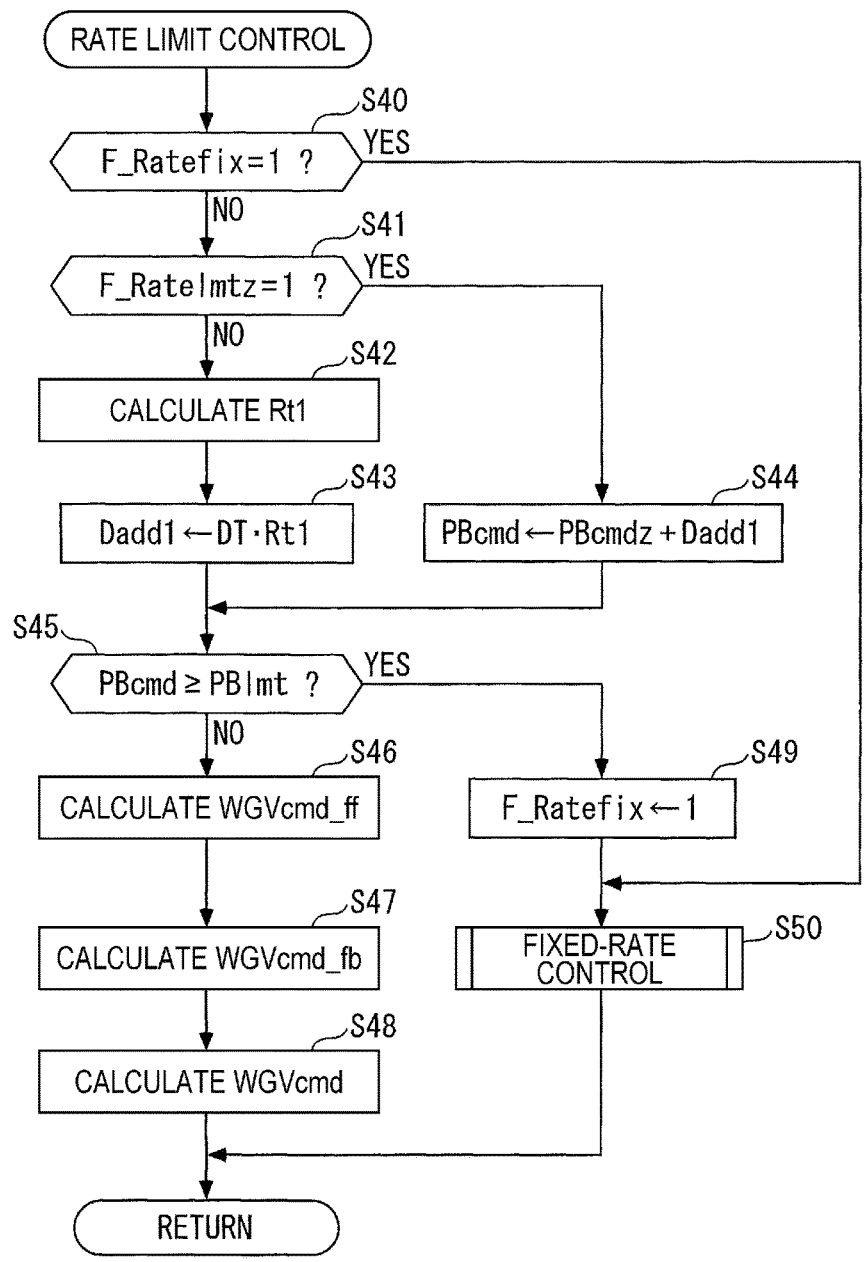
FIG. 4 is a flowchart of a rate limit control process.

As illustrated in FIG. 4, in step 40, it is determined whether or not a fixed-rate condition flag F_Ratefix is set to "1". The fixed-rate condition flag F_Ratefix indicates whether or not the condition for performing a fixed-rate control process described below is satisfied.

If the determination result in step 40 is NO, that is, the condition for performing the fixed-rate control process is not satisfied, the process proceeds to step 41 in which it is determined whether or not the previous value F_Ratelmtz of the rate limit condition flag is set to "1".

If the determination result is NO, that is, the current control timing is the first execution timing of the rate limit control process, the process proceeds to step 42 in which a map (not illustrated) is searched in accordance with the engine rotational speed NE. Thus, a first increase rate Rt1 (first given rate) is calculated. The first increase rate Rt1 is calculated as the amount of an increase in the target boost pressure PBcmd per unit time (control cycle DT).

The process proceeds to step 43 in which a first addition term Dadd1 is set to the product of the control cycle DT and the first increase rate Rt1, DT·Rt1. Then, the process proceeds to step 45 described below.

In contrast, if the determination result in step 41 is YES, that is, the rate limit control process has been performed at a control timing before the current control timing, the process proceeds to step 44 in which the target boost pressure PBcmd is set to the sum of the previous value PBcmdz of the target boost pressure PBcmd and the first addition term Dadd1 (PBcmdz+Dadd1). Then the process proceeds to step 45.

In step 45 which is the next step of step 43 or 44, it is determined whether or not the target boost pressure PBcmd is equal to or higher than the given threshold pressure PBlmt. If the determination result is NO, that is, PBcmd<PBlmt, a similar method to the method in steps 7 to 9 described above is used to perform steps 46 to 48, and the target waste gate valve opening WGVcmd is calculated in step 48. Then, the process ends.

In contrast, if the determination result in step 45 is YES, that is, PBcmd≥PBlmt, it is determined that the condition for performing the fixed-rate control process is satisfied. To indicate this, the process proceeds to step 49 in which the fixed-rate condition flag F_Ratefix is set to "1". Then, the process proceeds to step 50.

Thus, when the fixed-rate condition flag F_Ratefix is set to "1" in step 49, the determination result in step 40 described above is YES at the next and subsequent control timings. Also in these cases, the process proceeds to step 50.

In step 50 which is the next step of step 40 or 49, the fixed-rate control process is performed as described below. Then, the process ends.

The fixed-rate control process described above will be described with reference to FIG. 5. In this control process, an increase ratio at which the target boost pressure PBcmd increases gradually towards the target steady-state boost pressure PBcmd_st is set to a certain value (second increase rate Rt2) with which occurrence of overshoot of the boost pressure PB with respect to the target steady-state boost pressure PBcmd_st may be suppressed. Thus, the boost pressure PB is controlled.

Figure 5:
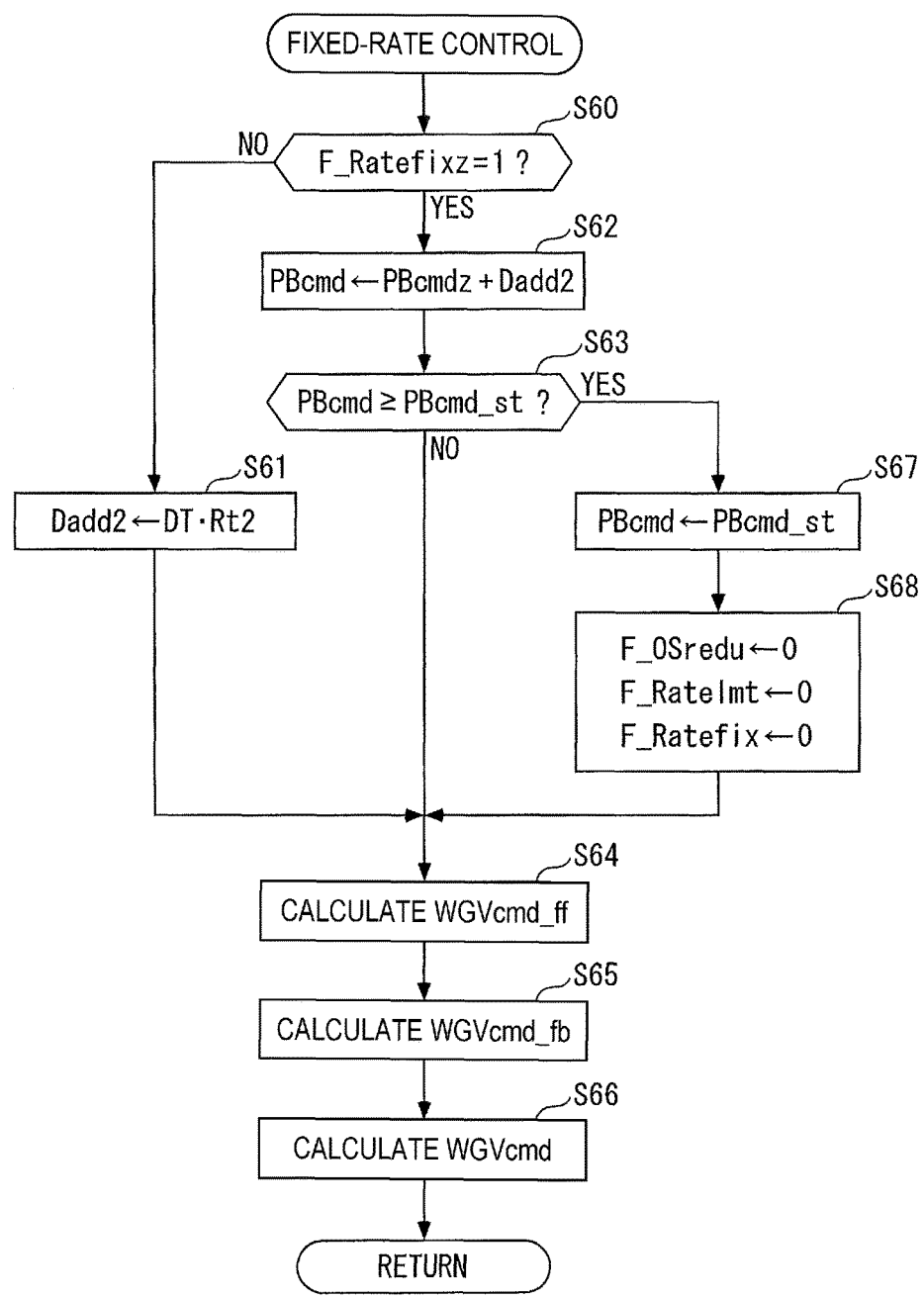
FIG. 5 is a flowchart of a fixed-rate control process.

As illustrated in FIG. 5, in step 60, it is determined whether or not the previous value F_Ratefixz of the fixed-rate condition flag is set to "1". If the determination result is NO, that is, the current control timing is the first execution timing of the fixed-rate control process, the process proceeds to step 61 in which a second addition term Dadd2 is set to the product of the control cycle DT and the second increase rate Rt2, DT·Rt2.

The second increase rate Rt2 (second given rate) is set as the amount of an increase in the target boost pressure PBcmd per unit time (control cycle DT). More specifically, when the target boost pressure PBcmd is increased from the given threshold pressure PBlmt by the second addition term Dadd2 each time, the second increase rate Rt2 that is equal to a certain value with which occurrence of overshoot of the boost pressure PB with respect to the target steady-state boost pressure PBcmd_st may be suppressed is set so that Rt1>Rt2 is satisfied.

A similar method to the method in steps 7 to 9 described above is used to perform steps 64 to 66. In step 66, the target waste gate valve opening WGVcmd is calculated. Then, the process ends.

In contrast, if the determination result in step 60 is YES, that is, the fixed-rate control process is executed at a control timing before the current control timing, the process proceeds to step 62 in which the target boost pressure PBcmd is set to the sum of the previous value PBcmdz of the target boost pressure PBcmd and the second addition term Dadd2 (PBcmdz+Dadd2).

The process proceeds to step 63 in which it is determined whether or not the target boost pressure PBcmd is equal to or higher than the target steady-state boost pressure PBcmd_st. If the determination result is NO, that is, the target boost pressure PBcmd does not reach the target steady-state boost pressure PBcmd_st, steps 64 to 66 are performed as described above. Then, the process ends.

In contrast, if the determination result in step 63 is YES, that is, the target boost pressure PBcmd reaches the target steady-state boost pressure PBcmd_st, the process proceeds to step 67 in which the target boost pressure PBcmd is set to the target steady-state boost pressure PBcmd_st.

In step 68, to indicate that the OS suppression control process is to end, the three flags F_OSredu, F_Ratelmt, and F_Ratefix described above are reset to "0".

As described above, steps 64 to 66 are performed. Then, the process ends.

Figure 6:
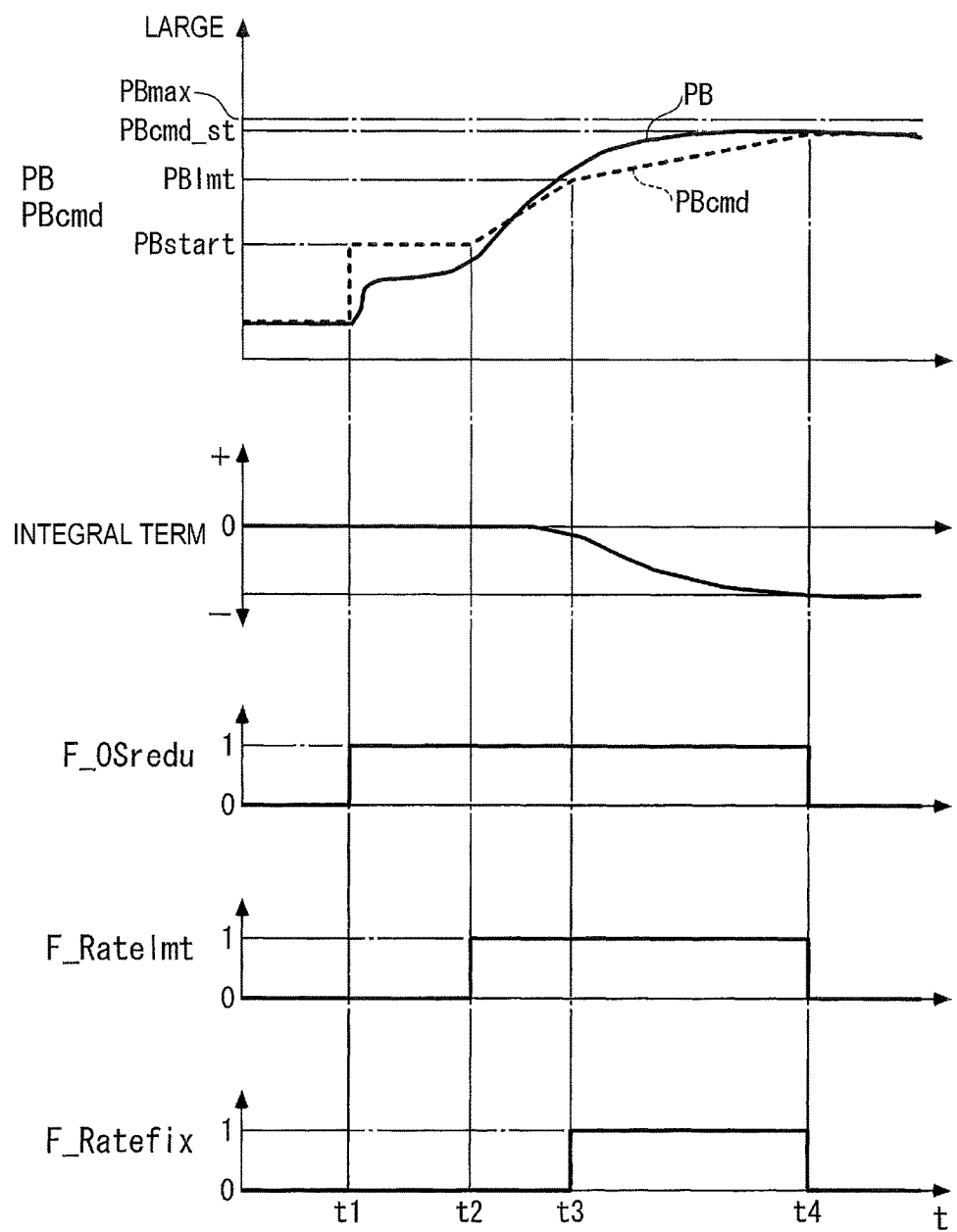
FIG. 6 is a timing chart illustrating an exemplary control result obtained when the OS suppression control process is performed in the boost pressure control process.
Figure 7:
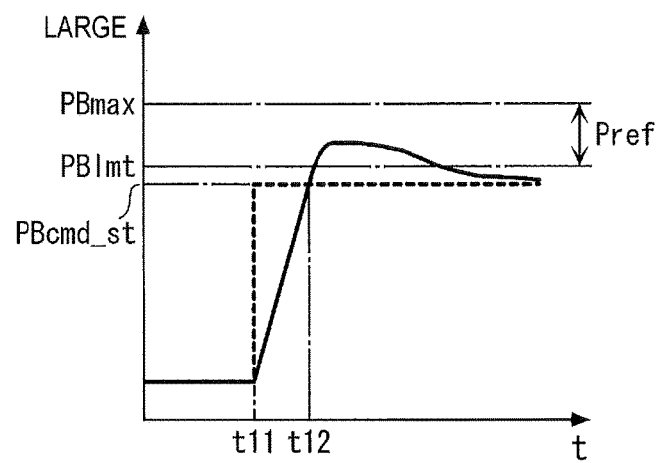
FIG. 7 is a timing chart illustrating an exemplary control result obtained when the target steady-state boost pressure PBcmd_st is lower than the given threshold pressure PBlmt in the boost pressure control process.

Control results obtained by the control apparatus 1 according to the present embodiment which has the above-described configuration will be described with reference to FIGS. 6 to 8. FIG. 6 illustrates an exemplary control result according to the present embodiment. In the exemplary control result, the target steady-state boost pressure PBcmd_st is set to the maximum map value described above (that is, a slightly smaller value than the upper-limit boost pressure PBmax) so that PBcmd_st>PBlmt is satisfied. FIG. 7 illustrates a control result according to the present embodiment in which PBcmd_st<PBlmt is satisfied.

As illustrated in FIG. 6, the target steady-state boost pressure PBcmd_st is set at time t1 so that PBcmd_st>PBlmt is satisfied. At that time, the above-described overshoot suppression condition flag F_OSredu is set to "1". At the same time, the target boost pressure PBcmd is set to the control start pressure PBstart. Thus, after that, control is exerted so that the boost pressure PB reaches the control start pressure PBstart. In progress of the control, the boost pressure PB gets close to the control start pressure PBstart. When DPB≤Dref is satisfied at time t2, the above-described rate limit condition flag F_Ratelmt is set to "1". After that, the rate limit control process is performed. Thus, the target boost pressure PBcmd is set so as to be increased by the first addition term Dadd1 each time. The boost pressure PB increases with the target boost pressure PBcmd being increased.

In progress of the control, when PBcmd PBlmt is satisfied at time t3, the above-described fixed-rate condition flag F_Ratefix is set to "1". After that, the fixed-rate control process is performed. Thus, the target boost pressure PBcmd is set so as to be increased by the second addition term Dadd2 each time. The boost pressure PB increases with the target boost pressure PBcmd being increased.

In progress of the control, when PBcmd≥PBcmd_st is satisfied at time t4, the target boost pressure PBcmd is set to the target steady-state boost pressure PBcmd_st. At the same time, the three flags F_OSredu, F_Ratelmt, and F_Ratefix are reset to "0". Thus, the OS suppression control process ends. As described above, when the OS suppression control process is performed, the boost pressure PB hardly overshoots the target steady-state boost pressure PBcmd_st. As a result, it is found that overshoot of the boost pressure PB with respect to the upper-limit boost pressure PBmax is suppressed.

This is because the above-described second increase rate Rt2 is set so that increase in the absolute value of the integral term in the PID control algorithm used to calculate the FB term WGVcmd_fb of the target waste gate valve opening ends by the timing at which the fixed-rate control process ends (time t4 in FIG. 6). That is, the reason is that, in execution of the fixed-rate control process from time t3 to time t4, the target boost pressure PBcmd is set so as to be increased by the second addition term Dadd2 each time. Thus, increase in the absolute value of the integral term in the PID control algorithm ends by time t4.

As illustrated in FIG. 7, when the target steady-state boost pressure PBcmd_st is set at time t11 so that PBcmd_st<PBlmt is satisfied, the target boost pressure PBcmd is set to the target steady-state boost pressure PBcmd_st. After that, control is exerted so that the boost pressure PB reaches the target steady-state boost pressure PBcmd_st. In progress of the control, the boost pressure PB overshoots the target steady-state boost pressure PBcmd_st at time t12. However, the boost pressure PB does not overshoot the upper-limit boost pressure PBmax. Finally, the boost pressure PB converges to the target steady-state boost pressure PBcmd_st.

As described above, it is found that, under the condition in which PBcmd_st<PBlmt is satisfied, since the boost pressure PB does not overshoot the upper-limit boost pressure PBmax, the OS suppression control process is not necessarily performed. To achieve this, the above-described given value Pref (in other words, the given threshold pressure PBlmt) is set to a value that satisfies the following condition: in the case where the target steady-state boost pressure PBcmd_st is calculated as the maximum map value, even when the control process in steps 6 to 9 is performed without execution of the OS suppression control process under the condition in which PBcmd_st=PBlmt is satisfied, control is exerted without fail so that the boost pressure PB does not overshoot the upper-limit boost pressure PBmax.

Figure 8:
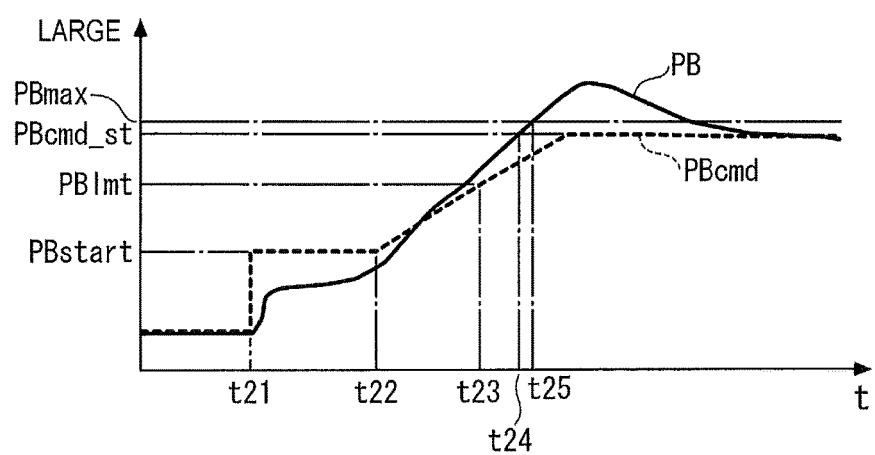
FIG. 8 is a timing chart illustrating an exemplary comparative control result obtained when the fixed-rate control process is skipped in the OS suppression control process.

In contrast, FIG. 8 illustrates an exemplary comparison control result obtained in the case where the amount of an increase in the target boost pressure PBcmd is maintained at the first addition term Dadd1 without execution of the fixed-rate control process in FIG. 5 even when PBcmd≥PBlmt is satisfied under the condition in which PBcmd_st≥PBlmt is satisfied.

As illustrated in FIG. 8, assume that, at and after the timing at which PBcmd≥PBlmt is satisfied (time t23), the amount of an increase in the target boost pressure PBcmd is maintained at the first addition term Dadd1. It is found that, after the boost pressure PB overshoots the target steady-state boost pressure PBcmd_st at time t24, the boost pressure PB also overshoots the upper-limit boost pressure PBmax at time t25. Therefore, in order that such occurrence of overshoot of the boost pressure PB with respect to the upper-limit boost pressure PBmax is suppressed, the fixed-rate control process is performed in the present embodiment. In step 62 in the fixed-rate control process, the amount of an increase in the target boost pressure PBcmd is set to the second addition term Dadd2 smaller than the first addition term Dadd1.

As described above, according to the boost pressure control process in the present embodiment, the target steady-state boost pressure PBcmd_st is calculated in accordance with the engine rotational speed NE and the accelerator position AP. In the case where the boost pressure PB is lower than the target steady-state boost pressure PBcmd_st, when the target steady-state boost pressure PBcmd_st is equal to or higher than the given threshold pressure PBlmt, the OS suppression control process in step 11 is performed. In the OS suppression control process, at start of the control, the target boost pressure PBcmd is set to the control start pressure PBstart lower than the target steady-state boost pressure PBcmd_st. In execution of the OS suppression control process, when the boost-pressure deviation DPB is equal to or less than the given value Dref, the rate limit control process is performed.

In the rate limit control process, the target boost pressure PBcmd is set so as to be increased gradually from the control start pressure PBstart with the first increase rate Rt1. Control is exerted so that the boost pressure PB reaches the target boost pressure PBcmd. At that time, in the case where the target boost pressure PBcmd is increased gradually with the first increase rate Rt1, when the target boost pressure PBcmd is equal to or higher than the given threshold pressure PBlmt, the fixed-rate control process is performed. In the fixed-rate control process, the target boost pressure PBcmd is set so as to be increased gradually to the target steady-state boost pressure PBcmd_st with the second increase rate Rt2. Control is exerted so that the boost pressure PB reaches the target boost pressure PBcmd. At that time, the second increase rate Rt2 is set as described above. Therefore, the boost pressure PB may reach the target steady-state boost pressure PBcmd_st in such a manner as to hardly overshoot the target steady-state boost pressure PBcmd_st. As a result, overshoot of the boost pressure PB with respect to the upper-limit boost pressure PBmax may be suppressed.

In contrast, in the case where the boost pressure PB is lower than the target steady-state boost pressure PBcmd_st, when the target steady-state boost pressure PBcmd_st is lower than the given threshold pressure PBlmt, the control process in steps 6 to 9 is performed. That is, a given feedback control algorithm is used to control the supercharging operation on the turbocharger 10 so that the boost pressure PB reaches the target steady-state boost pressure PBcmd_st. In this case, the given value Pref, that is, the given threshold pressure PBlmt, is set as described above. Therefore, under the condition in which PBcmd_st<PBlmt is satisfied, even when the control process in steps 6 to 9 is performed without execution of the OS suppression control process, control may be exerted without fail so that the boost pressure PB does not overshoot the upper-limit boost pressure PBmax.

As described above, regardless of the relationship in magnitude between the target steady-state boost pressure PBcmd_st and the given threshold pressure PBlmt (that is, regardless of whether or not the OS suppression control process is performed), control may be exerted so that the boost pressure PB does not overshoot the upper-limit boost pressure PBmax, and occurrence of the state in which the torque produced by the engine 3 exceeds the upper limit of the capacity of torque transmittable in the drive system may be suppressed. Thus, an appropriate operation state of the drive system may be ensured, resulting in a longer life of the drive system. As a result, the marketability may be improved.

The embodiment is an example using the turbocharger 10 as a supercharger. The supercharger provided by the present disclosure is not limited to this. Any supercharger may be employed as long as the boost pressure may be changed. Examples of the supercharger include a mechanical supercharger in which a compressor is driven by using power of an internal combustion engine, an electric turbocharger in which a compressor is driven by using an electromotor, and an electric turbocharger in which a compressor and a turbine are driven by using an electromotor.

The embodiment is an example using a PID control algorithm as the given feedback control algorithm. The given feedback control algorithm used in the present disclosure is not limited to this. Any algorithm may be used as long as the algorithm enables feedback control causing boost pressure to reach target boost pressure. Examples of the given feedback control algorithm include a proportional-integral (PI) control algorithm and a response assignment control algorithm such as a sliding-mode control algorithm.

The embodiment is an example using a certain value as the second increase rate Rt2. However, the second increase rate Rt2 may be set in accordance with the operation state of the engine 3 (for example, the engine rotational speed NE and the accelerator position AP).

The embodiment is an example in which the control apparatus 1 provided by the present disclosure is applied to the internal combustion engine 3 for vehicles. The control apparatus provided by the present disclosure is not limited to this. Any engine may be applied as long as the engine is provided with a supercharger. For example, the control apparatus 1 may be also applied to an internal combustion engine for ships, or an internal combustion engine for other industrial equipment.

According to a first aspect of the disclosure, there is provided a control apparatus for an internal combustion engine. The control apparatus controls boost pressure through control of a supercharger. The control apparatus includes a boost-pressure acquiring unit, a target steady-state boost pressure calculating unit, a first boost pressure controller, a target-boost-pressure setting unit, a second boost pressure controller, and an inhibiting/allowing unit. The boost-pressure acquiring unit acquires the boost pressure. The target steady-state boost pressure calculating unit calculates target steady-state boost pressure which is a target of the boost pressure when the internal combustion engine operates in a steady state. The calculation is performed in accordance with an operation state of the internal combustion engine. When the boost pressure is lower than the target steady-state boost pressure, the first boost pressure controller performs first boost pressure control by using a given feedback control algorithm in such a manner that the boost pressure reaches target boost pressure. In the first boost pressure control, the supercharger is controlled. The target-boost-pressure setting unit performs a first setting operation, a second setting operation, and a third setting operation. The first setting operation is an operation in which, when the first boost pressure control starts, the target-boost-pressure setting unit sets the target boost pressure to a given pressure. The given pressure is lower than the target steady-state boost pressure. The second setting operation is an operation in which, in the case where the target boost pressure is set to the given pressure, when a deviation between the boost pressure obtained in execution of the first boost pressure control and the given pressure is equal to or less than a given value, the target-boost-pressure setting unit sets the target boost pressure in such a manner that the target boost pressure is increased gradually with a first given rate from the given pressure. The third operation is an operation in which, in the case where the target boost pressure is increased gradually with the first given rate, when the target boost pressure is equal to or higher than a given threshold pressure, the target-boost-pressure setting unit sets the target boost pressure in such a manner that the target boost pressure is increased gradually with a second given rate to the target steady-state boost pressure. The second given rate is smaller than the first given rate. When the boost pressure is lower than the target steady-state boost pressure, the second boost pressure controller performs second boost pressure control by using the given feedback control algorithm in such a manner that the boost pressure reaches the target steady-state boost pressure. In the second boost pressure control, the supercharger is controlled. In the case where the boost pressure is lower than the target steady-state boost pressure, when the target steady-state boost pressure is lower than the given threshold pressure, the inhibiting/allowing unit inhibits execution of the first boost pressure control and allows execution of the second boost pressure control.

In the control apparatus for the internal combustion engine, the target steady-state boost pressure which is a target of the boost pressure when the internal combustion engine operates in the steady state is calculated in accordance with the operation state of the internal combustion engine. In the case where the boost pressure is lower than the target steady-state boost pressure, when the target steady-state boost pressure is lower than the given threshold pressure, execution of the first boost pressure control is inhibited, and execution of the second boost pressure control is allowed. That is, the second boost pressure control for controlling the supercharger is performed by using the given feedback control algorithm so that the boost pressure reaches the target steady-state boost pressure. Therefore, by setting the given threshold pressure appropriately, even when the boost pressure overshoots the target steady-state boost pressure, execution of the second boost pressure control enables suppression of occurrence of the state in which the torque produced in the internal combustion engine exceeds the allowable upper limit. Thus, for example, when the internal combustion engine is mounted in a vehicle as a power source, the state in which the produced torque exceeds the capacity of torque transmittable in the drive system may be suppressed. Thus, an appropriate operation state of the drive system may be obtained, and the life of the drive system may be prolonged. As a result, the marketability may be improved (The expression "acquire" in "acquires the boost pressure" in the application encompasses not only direct detection of the boost pressure using a sensor or the like but also calculation/estimation of the boost pressure based on other parameters.)

According to a second aspect of the disclosure, in the control apparatus for the internal combustion engine according to the first aspect, the given threshold pressure may be set to a value with which occurrence of overshoot of the boost pressure with respect to an upper-limit boost pressure is capable of being suppressed in execution of the second boost pressure control. The upper-limit boost pressure may be set to boost pressure corresponding to an upper-limit value of produced torque allowable for the internal combustion engine.

In the control apparatus for the internal combustion engine, the given threshold pressure is set to a value with which occurrence of overshoot of the boost pressure with respect to the upper-limit boost pressure may be suppressed in execution of the second boost pressure control. In addition, the upper-limit boost pressure is set to a boost pressure corresponding to the upper limit of the produced torque allowable in the internal combustion engine. Therefore, in execution of the second boost pressure control, overshoot of the boost pressure with respect to the upper-limit boost pressure may be suppressed. Thus, the state in which the torque produced in the internal combustion engine exceeds the upper limit of the produced torque allowable in the internal combustion engine may be suppressed, improving the marketability.

According to a third aspect of the disclosure, in the control apparatus for the internal combustion engine according to the first aspect, in the case where the boost pressure is lower than the target steady-state boost pressure, when the target steady-state boost pressure is equal to or higher than the given threshold pressure, the inhibiting/allowing unit may inhibit execution of the second boost pressure control and allows execution of the first boost pressure control.

In the control apparatus for the internal combustion engine, when the target steady-state boost pressure is equal to or higher than the given threshold pressure, execution of the second boost pressure control is inhibited and execution of the first boost pressure control is allowed. That is, the first boost pressure control for controlling the supercharger is performed by using the given feedback control algorithm so that the boost pressure reaches the target boost pressure. In this case, when the first boost pressure control starts, the target boost pressure is set to the given pressure lower than the target steady-state boost pressure. In the case where the target boost pressure is set to the given pressure, when the deviation between the boost pressure obtained in execution of the first boost pressure control and the given pressure is equal to or less than the given value, the target boost pressure is set so as to be increased gradually with the first given rate from the given pressure. In addition, in the case where the target boost pressure is increased gradually with the first given rate, when the target boost pressure is equal to or higher than the given threshold pressure, the target boost pressure is set so as to be increased gradually to the target steady-state boost pressure with the second given rate smaller than the first given rate. Therefore, the first given rate, the second given rate, and the given threshold pressure are appropriately set. Thus, in execution of the first boost pressure control, when the boost pressure is changed finally towards the target steady-state boost pressure while following the target boost pressure, occurrence of overshoot of the boost pressure with respect to the target steady-state boost pressure may be suppressed. Thus, when the boost pressure is changed towards the target steady-state boost pressure in execution of the first boost pressure control, the state in which the torque produced in the internal combustion engine exceeds the upper limit may be suppressed. As a result, the marketability may be improved.

Obviously, numerous modifications and variations of the present invention are possible in light of the above teachings. It is therefore to be understood that within the scope of the appended claims, the invention may be practiced otherwise than as specifically described herein.

What is claimed is:
1. A control apparatus for an internal combustion engine, the control apparatus controlling boost pressure through control of a supercharger, the control apparatus comprising:
   a boost-pressure acquiring unit that acquires the boost pressure;
   a target steady-state boost pressure calculating unit that calculates target steady-state boost pressure which is a target of the boost pressure when the internal combustion engine operates in a steady state, the calculation being performed in accordance with an operation state of the internal combustion engine;
   a first boost pressure controller that, when the boost pressure is lower than the target steady-state boost pressure, performs first boost pressure control by using a given feedback control algorithm in such a manner that the boost pressure reaches target boost pressure, the first boost pressure control being control for controlling the supercharger;
   a target-boost-pressure setting unit that performs a first setting operation, a second setting operation, and a third setting operation, the first setting operation being an operation in which, when the first boost pressure control starts, the target-boost-pressure setting unit sets the target boost pressure to a given pressure, the given pressure being lower than the target steady-state boost pressure, the second setting operation being an operation in which, in the case where the target boost pressure is set to the given pressure, when a deviation between the boost pressure obtained in execution of the first boost pressure control and the given pressure is equal to or less than a given value, the target-boost-pressure setting unit sets the target boost pressure in such a manner that the target boost pressure is increased gradually with a first given rate from the given pressure, the third operation being an operation in which, in the case where the target boost pressure is increased gradually with the first given rate, when the boost pressure obtained in execution of the first boost pressure control is equal to or higher than a given threshold pressure, the target-boost-pressure setting unit sets the target boost pressure in such a manner that the target boost pressure is increased gradually with a second given rate to the target steady-state boost pressure, the second given rate being smaller than the first given rate;
   a second boost pressure controller that, when the boost pressure is lower than the target steady-state boost pressure, performs second boost pressure control by using the given feedback control algorithm in such a manner that the boost pressure reaches the target steady-state boost pressure, the second boost pressure control being control for controlling the supercharger; and an inhibiting/allowing unit that, in the case where the boost pressure is lower than the target steady-state boost pressure, when the target steady-state boost pressure is lower than the given threshold pressure, inhibits execution of the first boost pressure control and allows execution of the second boost pressure control.

2. The control apparatus for the internal combustion engine according to claim 1, wherein the given threshold pressure is set to a value with which occurrence of overshoot of the boost pressure with respect to an upper-limit boost pressure is capable of being suppressed in execution of the second boost pressure control, and wherein the upper-limit boost pressure is set to boost pressure corresponding to an upper-limit value of produced torque allowable for the internal combustion engine.

3. The control apparatus for the internal combustion engine according to claim 1, wherein, in the case where the boost pressure is lower than the target steady-state boost pressure, when the target steady-state boost pressure is equal to or higher than the given threshold pressure, the inhibiting/allowing unit inhibits execution of the second boost pressure control and allows execution of the first boost pressure control.

4. A control apparatus for an internal combustion engine with a supercharger, comprising:

a boost-pressure detector to detect a boost pressure controlled by the supercharger;

calculating circuitry configured to calculate, in accordance with an operation state of the internal combustion engine, a steady-state target boost pressure in a steady operation state of the internal combustion engine;

first boost pressure control circuitry configured to perform first boost pressure control with a feedback control algorithm to control the supercharger such that the boost pressure reaches a target pressure if the boost pressure is lower than the steady-state target boost pressure;

target pressure setting circuitry configured to
set the target pressure to an initial target pressure lower than the steady-state target boost pressure when the first boost pressure control starts,
gradually increase the target pressure from the initial target pressure at a first rate if the target pressure is set to the initial target pressure and if a difference pressure between the boost pressure detected during execution of the first boost pressure control and the initial target pressure is equal to or less than a difference threshold pressure, and
gradually increase the target pressure to the steady-state target boost pressure from the initial target pressure at a second rate smaller than the first rate if the boost pressure detected during execution of the first boost pressure control is equal to or higher than a threshold pressure while the target pressure is increased gradually at the first rate;

second boost pressure control circuitry configured to perform second boost pressure control with the feedback control algorithm to control the supercharger such that the boost pressure reaches the steady-state target boost pressure if the boost pressure is lower than the steady-state target boost pressure; and inhibiting/allowing circuitry configured to inhibit execution of the first boost pressure control and allow execution of the second boost pressure control if the boost pressure is lower than the steady-state target boost pressure and if the steady-state target boost pressure is lower than the threshold pressure.

5. The control apparatus for the internal combustion engine according to claim 4, wherein the threshold pressure is set to a value with which occurrence of overshoot of the boost pressure with respect to an upper-limit boost pressure is to be suppressed in execution of the second boost pressure control, and wherein the upper-limit boost pressure is set to boost pressure corresponding to an upper-limit value of produced torque allowable for the internal combustion engine.

6. The control apparatus for the internal combustion engine according to claim 4, wherein, in a case where the boost pressure is lower than the steady-state target boost pressure, when the steady-state target boost pressure is equal to or higher than the threshold pressure, the inhibiting/allowing circuitry inhibits execution of the second boost pressure control and allows execution of the first boost pressure control.

7. A control apparatus for an internal combustion engine with a supercharger, comprising:

boost-pressure detecting means for detecting a boost pressure controlled by the supercharger;

calculating means for calculating, in accordance with an operation state of the internal combustion engine, a steady-state target boost pressure in a steady operation state of the internal combustion engine;

first boost pressure control means for performing first boost pressure control with a feedback control algorithm to control the supercharger such that the boost pressure reaches a target pressure if the boost pressure is lower than the steady-state target boost pressure;

initial target pressure setting means for setting the target pressure to an initial target pressure lower than the steady-state target boost pressure when the first boost pressure control starts;

first gradually increasing means for gradually increasing the target pressure from the initial target pressure at a first rate if the target pressure is set to the initial target pressure and if a difference pressure between the boost pressure detected during execution of the first boost pressure control and the initial target pressure is equal to or less than a difference threshold pressure;

second gradually increasing means for gradually increasing the target pressure to the steady-state target boost pressure from the initial target pressure at a second rate smaller than the first rate if the boost pressure detected during execution of the first boost pressure control is equal to or higher than a threshold pressure while the target pressure is increased gradually at the first rate;

second boost pressure control means for performing second boost pressure control with the feedback control algorithm to control the supercharger such that the boost pressure reaches the steady-state target boost pressure if the boost pressure is lower than the steady-state target boost pressure; and inhibiting/allowing means for inhibiting execution of the first boost pressure control and allowing execution of the second boost pressure control if the boost pressure is lower than the steady-state target boost pressure and if the steady-state target boost pressure is lower than the threshold pressure.

8. A method for controlling an internal combustion engine with a supercharger, comprising:
   detecting a boost pressure controlled by the supercharger;
   calculating, in accordance with an operation state of the internal combustion engine, a steady-state target boost pressure in a steady operation state of the internal combustion engine;
   performing first boost pressure control with a feedback control algorithm to control the supercharger such that the boost pressure reaches a target pressure if the boost pressure is lower than the steady-state target boost pressure;
   setting the target pressure to an initial target pressure lower than the steady-state target boost pressure when the first boost pressure control starts;
   gradually increasing the target pressure from the initial target pressure at a first rate if the target pressure is set to the initial target pressure and if a difference pressure between the boost pressure detected during execution of the first boost pressure control and the initial target pressure is equal to or less than a difference threshold pressure;
   gradually increasing the target pressure to the steady-state target boost pressure from the initial target pressure at a second rate smaller than the first rate if the boost pressure detected during execution of the first boost pressure control is equal to or higher than a threshold pressure while the target pressure is increased gradually at the first rate;
   performing second boost pressure control with the feedback control algorithm to control the supercharger such that the boost pressure reaches the steady-state target boost pressure if the boost pressure is lower than the steady-state target boost pressure; and
   inhibiting execution of the first boost pressure control and allowing execution of the second boost pressure control if the boost pressure is lower than the steady-state target boost pressure and if the steady-state target boost pressure is lower than the threshold pressure.

* * * * *